Nov. 18, 1930.  A. A. HELMECKE  1,781,903
WELL TOOL
Filed Aug. 28, 1929   2 Sheets-Sheet 1
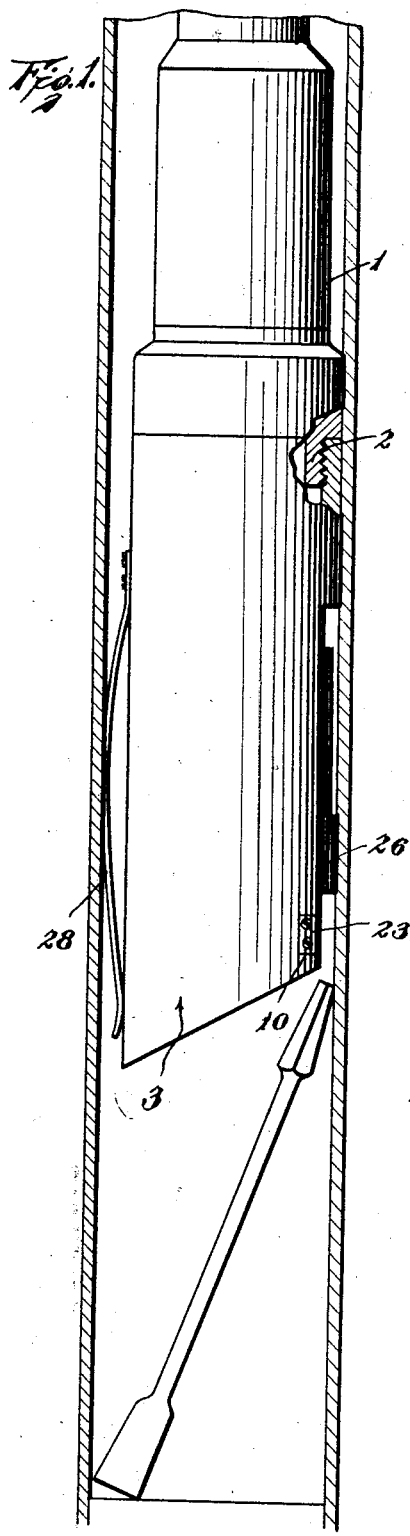
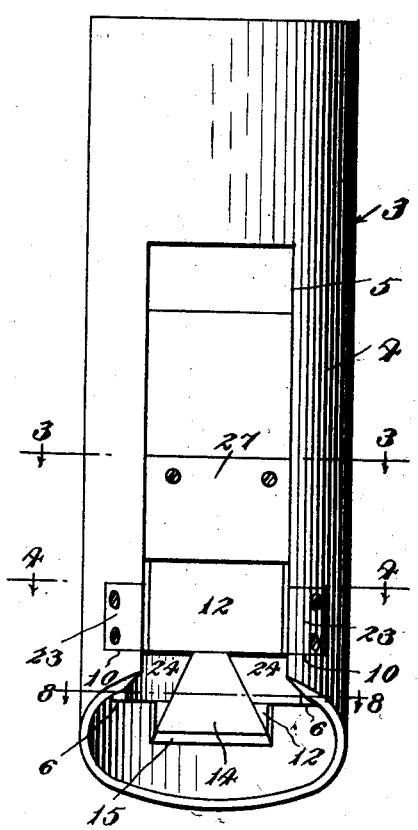
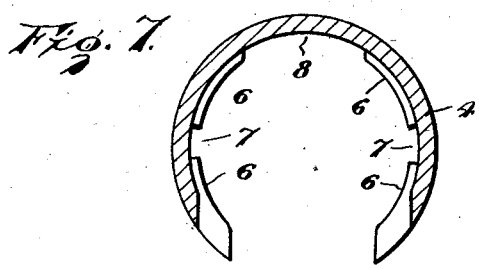
Inventor
A. A. Helmecke
By Lacey & Lacey, Attorneys Nov. 18, 1930.  A. A. HELMECKE  1,781,903
WELL TOOL
Filed Aug. 28, 1929  2 Sheets-Sheet 2

Inventor
A. A. Helmecke
By Lacey & Lacey, Attorneys

Patented Nov. 18, 1930

1,781,903

UNITED STATES PATENT OFFICE

ARTHUR A. HELMECKE, OF BAY CITY, TEXAS

WELL TOOL

Application filed August 28, 1929. Serial No. 389,031.

The present invention is directed to improvements in well tools.

The primary object of the invention is to provide a device of this character so constructed that a lost tool can be conveniently removed from the well when the same is lost and assumes an inclined position therein.

Another object of the invention is to provide a device of this character so constructed that when the device is lowered into the well the upper end of the lost tool will be lined with the fishing tool so that it may enter therein to be gripped so that it can be removed from the well.

Another object of the invention is to provide a device of this character which is simple in construction, efficient in operation, durable, and one which can be manufactured at a minimum cost.

Another object of the invention is to provide a device of this character which can be easily and quickly attached to the fishing tool to be lowered into the well.

In the drawings:

Figure 1 is a side view of the device showing the same in position for engaging a tool.

Figure 2 is a front view of the device.

Figure 7 is a sectional view on the line 7—7 of Figure 2, with the barrel removed.

Figure 3:
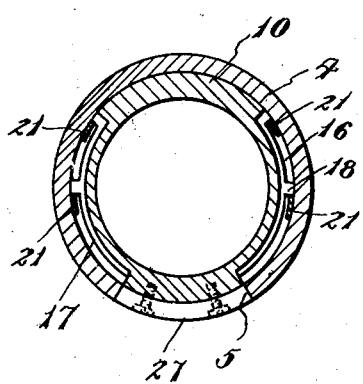
Figure 3 is a sectional view on the line 3—3 of Figure 2.
Figure 5:
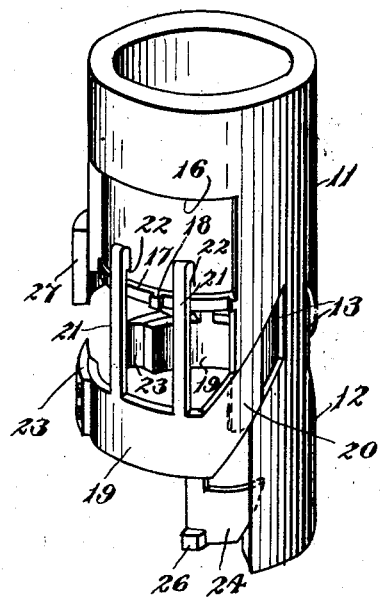
Figure 5 is a perspective view of the barrel.
Figure 4:
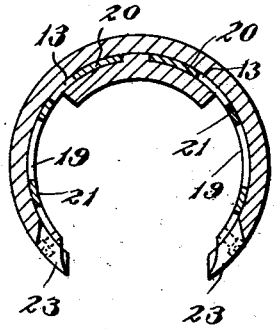
Figure 4 is a sectional view on the line 4—4 of Figure 2.
Figure 6:
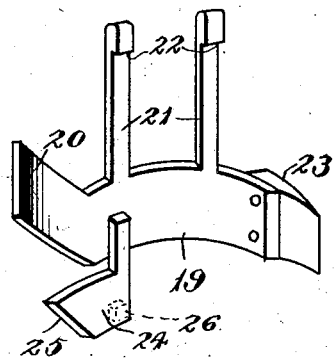
Figure 6 is a similar view of the plates and associated parts.
Figure 8:
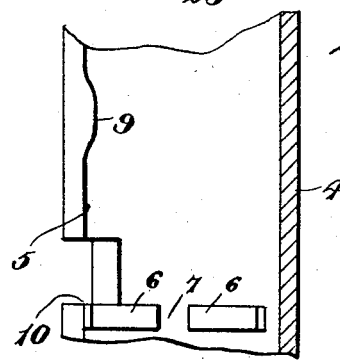
Figure 8 is a fragmentary vertical sectional view through the cylinder.

Referring to the drawings, the numeral 1 designates a fishing tool which may be of special design or of a conventional form, it being essential, however, that the same be provided with an exteriorly threaded rim 2 for threaded engagement in the upper end of the lining up member, designated generally by the numeral 3. This member comprises a cylinder 4 having a slot 5 formed longitudinally thereof which opens at the lower end of the cylinder and has formed interiorly thereof and adjacent its lower end, horizontal ribs 6—6 arranged in pairs and spaced to provide relatively small passages 7. The innermost ribs of each pair are spaced, as at 8, the purpose of which will later appear.

Arranged upon each side of the slot 5 are cams 9—9 and between said cams the cylinder is cut to provide diametrically opposed seats 10 which open into said slot.

Slidable in the cylinder 4 is a barrel 11, the lower end of which is provided with a depending skirt 12, said skirt having formed in its outer face inclined guide grooves 13, while the inner face thereof is provided with a V-shaped cam 14 having a beveled lower edge 15.

The barrel is provided upon opposite sides with recesses 16, the lower walls of which constitute stop ribs 17, said ribs having lugs 18 carried thereby.

A pair of curved tool engaging plates 19 are provided and have inclined extensions 20 carried thereby for slidably engaging the guide grooves 13. The plates 19 are each provided with a pair of laterally spaced vertical arms 21 having shoulders 22 for engagement with the stop ribs 17 in a manner to be hereinafter described.

The plates 19 have bolted thereto blocks 23 which are movable into and out of engagement with the seats 10.

The plates are further provided with heads 24 said heads having beveled edges 25 for engaging the V-shaped cam 14. The heads are provided with lugs 26.

The barrel 11 has bolted thereto a plate 27 which slides in the slot 5 and limits the upward sliding movement of the barrel, the downward sliding movement thereof being limited by the plates 19 upon engaging the ribs 6.

The cylinder 4 has secured thereto a leaf springs 28 which is adapted to urge the cylinder toward one side of the well hole so that it will at all times assume a position to remove a tool which has its upper end or shank end resting against the side of the well.

When a drill or other tool is lost or becomes detached from its connection and assumes an inclined position, as shown in Figure 1 of the drawings, and assumes such a position that it cannot be lined up for entering the conventional fishing tool, the cylinder 4 is then secured to the fishing tool and the device lowered into the well. When the shank of the tool enters the lower end of the slot 5 and the cylinder is lowered further, the upper end of the shank will engage the plate 27, and as the cylinder continues to move downwardly the plate will slide upwardly in the slot, thus elevating the barrel within the cylinder. As the barrel moves upwardly, the V-shaped cam 14 will spread the heads 24, due to the beveled edges 25 engaging the sides of said cam. The heads 24 are then forced away from each other and carry with them the plates 19, while the blocks 23 disengage the seats 10. At this time, the lugs 26 may pass through the passages 7. The shoulders 22 of the arms will engage the stop ribs 17 so that as the barrel continues upwardly, the plates 19 will be lifted. The plates 19 then engage the cams 9 so that the blocks 23 will approach each other and span the tool shank in order to line the same up so that it will pass into the fishing tool where it is gripped and can be lifted from the well. Obviously, as the plates 19 slide toward each other, the tool shank will be moved and caused to assume a position axially within the barrel so that it can then freely enter the fishing tool for engagement thereby. The extensions 20 serve to evenly guide the plates during their sliding movement.

By providing the fishing tool with the rim 2 the cylinder can be conveniently attached thereto and when the fishing tool is used alone, a thread protecting band can be conveniently threaded upon the rim to protect the same so that the tool can be used in the usual manner.

From the foregoing, it is thought that the operation and many advantages of the herein described invention will be apparent to those skilled in the art without further description and it will be understood that various changes in the size, shape, proportion and minor details of construction may be resorted to without departing from the spirit or sacrificing any of the advantages of the invention.

What is claimed is:

1. A tool of the class described comprising a cylinder, a barrel slidable therein, a pair of plates slidably connected with the barrel, cooperating means carried by the barrel and plates for sliding the plates toward each other during upward sliding movement of the barrel within the cylinder.

2. A tool of the class described comprising a cylinder, a barrel slidable in the cylinder, a pair of plates slidably connected with the barrel, heads carried by the plates, a cam carried by the barrel and adapted to engage the heads to slide the plates toward each other during upward sliding movement of the barrel within the cylinder.

3. A tool of the class described comprising a cylinder for attachment to a well fishing tool, a barrel slidable in the cylinder, a pair of plates slidably connected with the barrel, and means carried by the barrel for sliding the plates toward each other upon upward movement of the barrel within the cylinder to guide a tool into the fishing tool.

4. A tool of the class described comprising a cylinder for attachment to a well fishing tool, said cylinder having a slot formed therein, a barrel mounted in the cylinder and slidable when encountering a tool in a well, said barrel having a pair of plates slidably connected therein, said plates being slidable toward each other for moving the tool through the slot for alinement with the fishing tool.

5. A tool of the class described comprising a cylinder for attachment to a well fishing tool, said cylinder having a barrel slidable therein, stop ribs carried by the barrel, a pair of plates slidably interlocked with the barrel and having arms carried thereby provided with shoulders for engaging the stop ribs, said cylinder having seats formed therein, blocks carried by the plates for engagement in the seats, and means carried by the barrel for sliding the plates toward each other to disengage the blocks from the seats when the barrel moves upwardly in the cylinder, said plates serving to line a tool shank or the like with the fishing tool.

6. A tool of the class described comprising a cylinder having a slot therein, cams upon opposite sides of the slot, a barrel slidable in the cylinder, a pair of plates slidably connected with the barrel, cooperating means carried by the barrel and plates for sliding the plates toward each other, and means for coupling the plates with the barrel to move the same upwardly therewith for engagement with the cams.

In testimony whereof I affix my signature.

ARTHUR A. HELMECKE. [L. S.]